United States Patent [19]
Montanelli

[11] 3,976,309
[45] Aug. 24, 1976

[54] REDUCIBLE VOLUME STRUCTURE, PARTICULARLY SUITABLE FOR BABY CARRIAGES

[76] Inventor: Enea Montanelli, Quarto Inferiore, Bologna, Italy

[22] Filed: Aug. 6, 1975

[21] Appl. No.: 602,364

[30] Foreign Application Priority Data
Dec. 10, 1974 Italy .................................. 3558/74
Apr. 10, 1975 Italy .................................. 3377/75

[52] U.S. Cl. ................................. 280/644; 280/42; 280/650
[51] Int. Cl.² ......................................... B62B 7/02
[58] Field of Search ............. 280/42, 642, 644, 647, 280/650, 47.25, 47.36, 47.4; 296/1 B, 28 B

[56] References Cited
UNITED STATES PATENTS

| | | | |
|---|---|---|---|
| 3,142,351 | 7/1964 | Green | 280/42 X |
| 3,836,164 | 9/1974 | Sugino et al. | 280/42 X |

FOREIGN PATENTS OR APPLICATIONS

| | | | |
|---|---|---|---|
| 36,255 | 9/1966 | Finland | 280/644 |
| 1,154,362 | 6/1969 | United Kingdom | 280/42 |

*Primary Examiner*—M. H. Wood, Jr.
*Assistant Examiner*—Michael J. Forman
*Attorney, Agent, or Firm*—Browdy & Neimark

[57] ABSTRACT

A baby carriage which can be collapsed to allow it to be carried, hooked onto an arm, and which when in open condition has a rigid back giving good support to the spine of the occupant, comprises: a pair of flat rigid members constituting the carriage back fastened to each other by a hinge on one side to allow them to adopt either a stable, roughly co-planar position or a position in which they are side by side; a first pair of arms situated at a point where the sides of the flat members opposite the sides hinged to one another are located, these being connected to the flat members to allow the latter to rotate with respect to the arms; the arms of the first pair being shaped such that their lower extremities sustain the supports for the front wheels of the carriage and their upper extremities, each with a handle, serve for steering or carrying the carriage; a second pair of arms arranged externally at the side of the arms of the first pair and articulated to them to provide with their upper furthermost parts, members with which to support the seat in the carriage, whilst their lower extremities sustain the carriage rear wheels; a third pair of arms articulated one to the other in their intermediate part, positioned behind the back of the carriage, roughly alongside the pair of flat members constituting the back, and connected "x" fashion to the first and second pair of arms.

10 Claims, 11 Drawing Figures

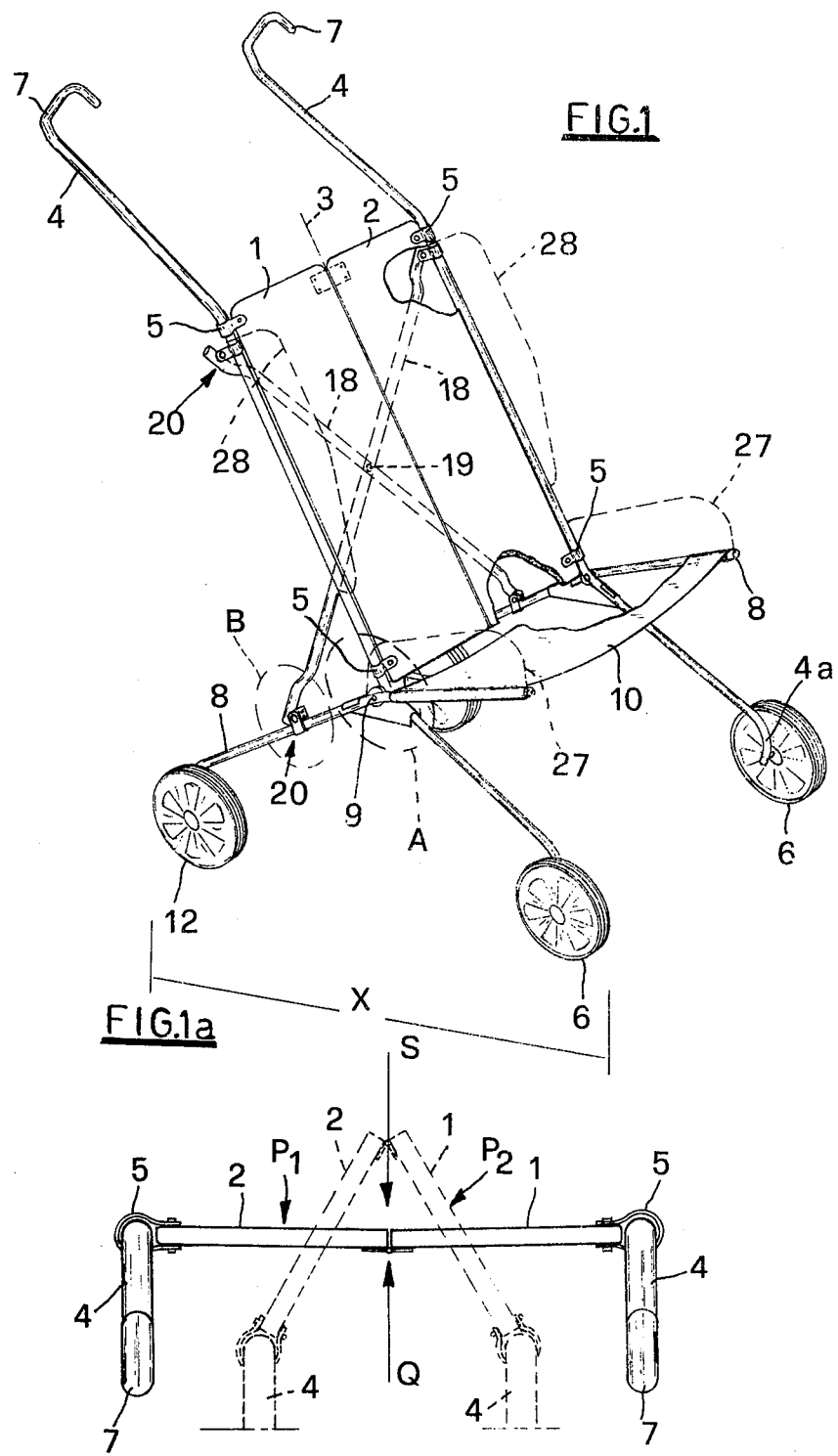

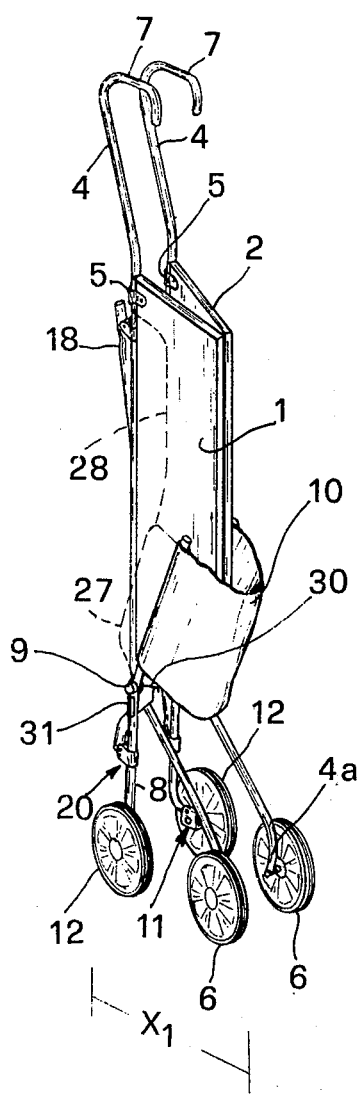
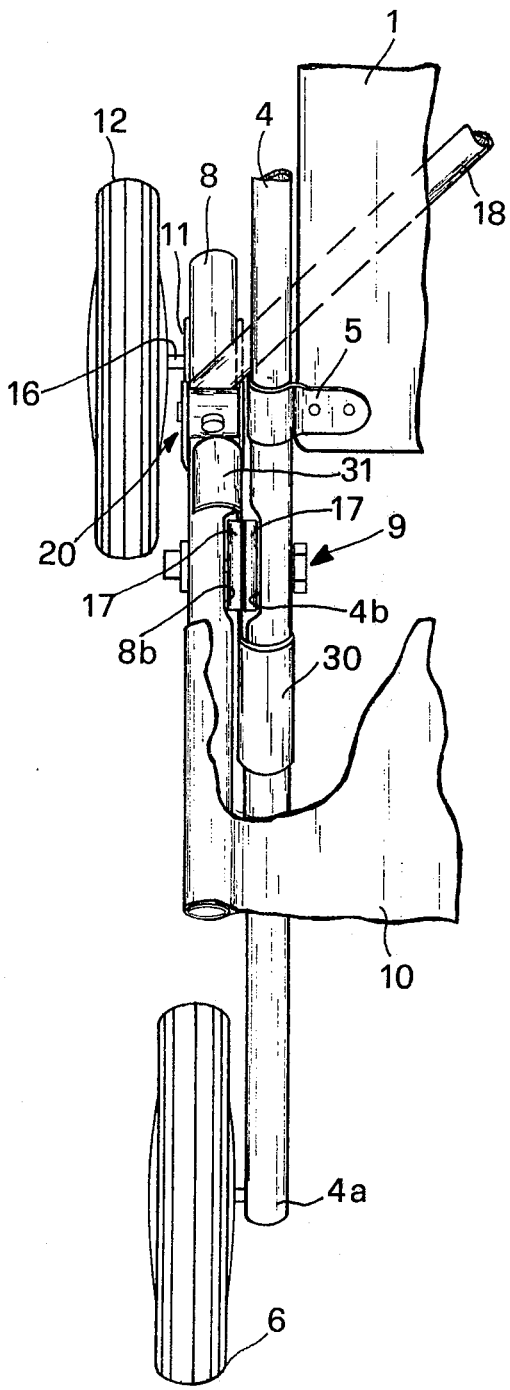

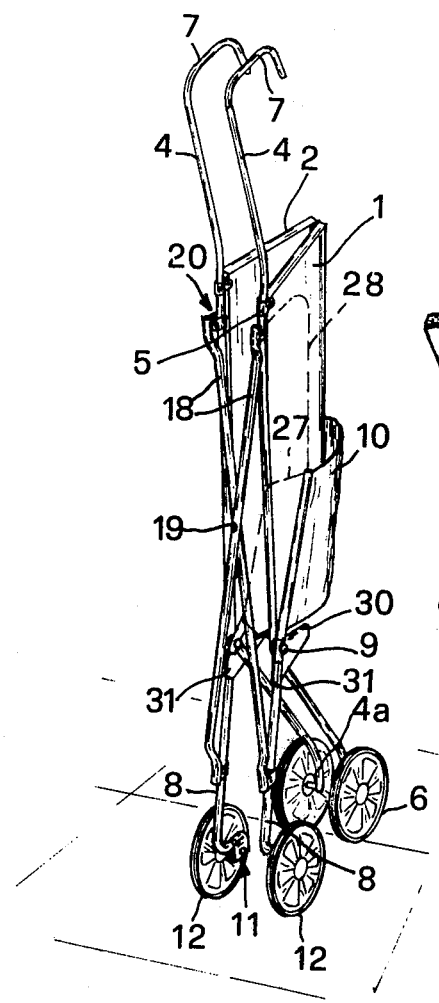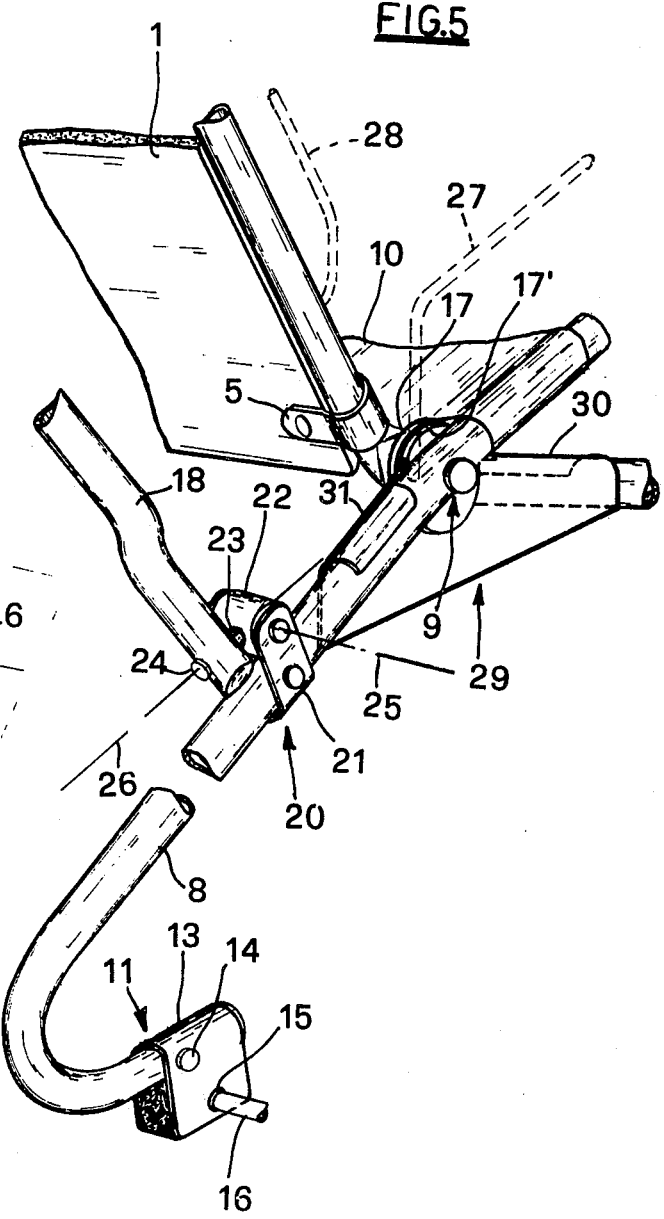

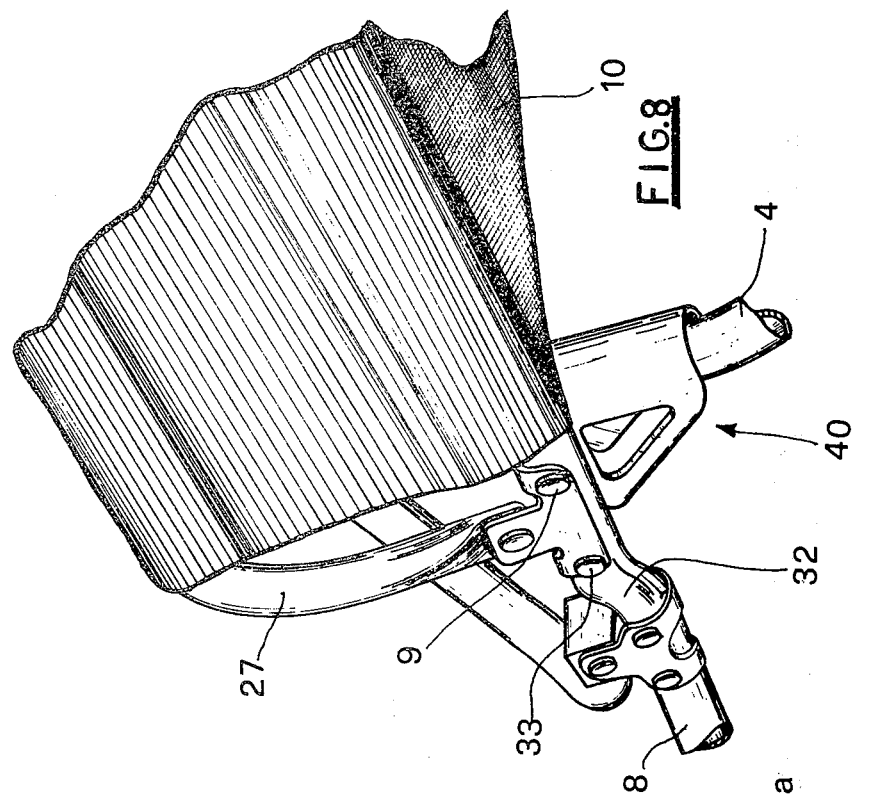
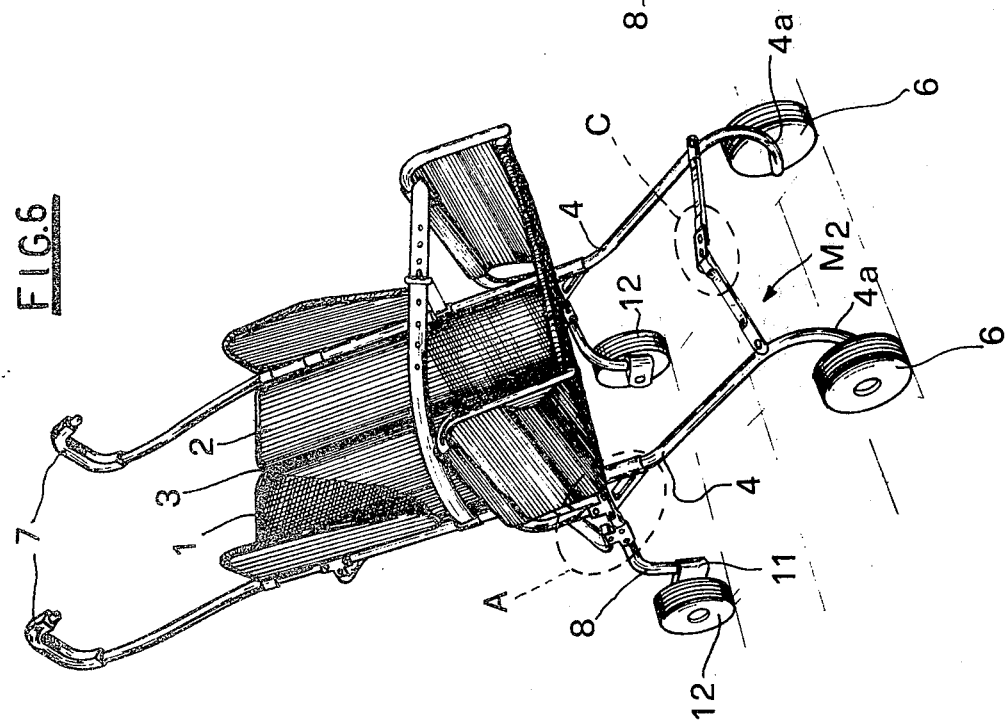

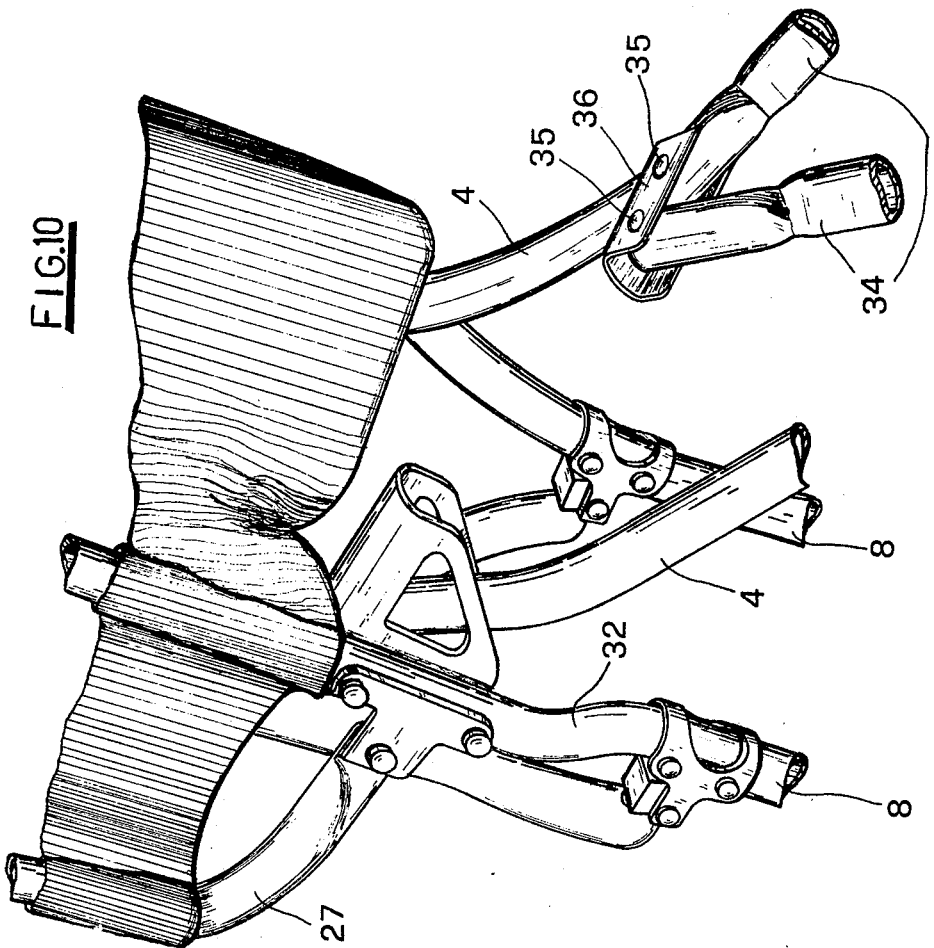
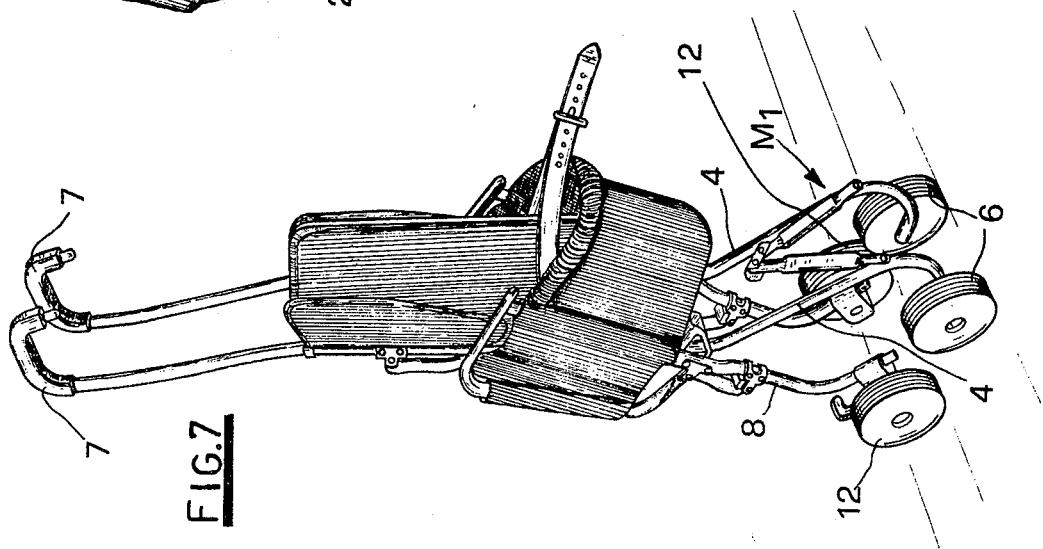

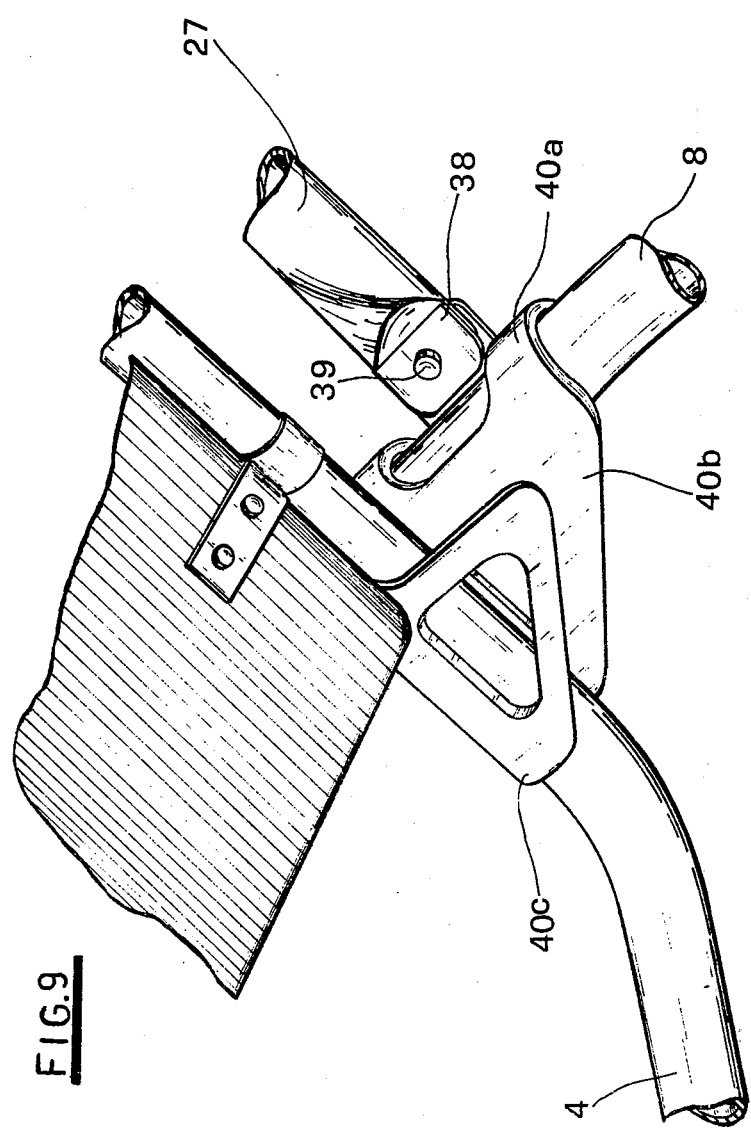

3,976,309

REDUCIBLE VOLUME STRUCTURE, PARTICULARLY SUITABLE FOR BABY CARRIAGES

BACKGROUND OF THE INVENTION

This invention relates to a reducible volume structure which has been studied particularly for the construction of baby carriages.

DESCRIPTION OF THE PRIOR ART

Perambulators and baby carriages are normally provided, as is known, with a wheel mounted frame onto which is fixed the compartment inside which the child is placed, the structure of which is made in such a way that it be possible to reduce it in size so that it only occupies a limited amount of space, especially when the said perambulator or baby carriage has to be carried in the trunk of an automobile or be generally stored away.

Such structures are customarily studied in a way which can enable them to be reduced in size along a given dimension, for example height, or along two dimensions (height and the maximum longitudinal overall dimension); in any case, however, they are particularly heavy and are not at all easy to carry.

Insofar as baby carriages are concerned, structures are, furthermore, known which incorporate the compartment in which the child is placed, and which can be reduced in size to allow them to be easily carried hooked onto an arm.

One known type of the latter mentioned structures has been studied in such a way as to support a piece of canvas which serves as the compartment into which the child is placed, and it is formed by a set of arms which are articulated to one another so as to form a first $x$ at the base of the structure. A second, third and fourth $x$ are articulated to the first $x$ and these form the lateral sides of the structure and the frame connecting the bottom of the said sides, respectively. The said connecting frame is provided with one or more arms arranged and connected one to the other in such a way as to constitute the rib members of the first and fourth $x$ in order to render the structure of the baby carriage stable when it is in its open condition, and to allow them to both rotate so that the said first and fourth $x$ can be closed or reduced to packet form in order to reduce the transverse volume of the entire structure.

A pair of arms complete the structure, and these, which are provided to steer the baby carriage, are articulated almost at the part intermediate to the $x$ which forms the frame connecting the rear part of the sides of the said structure, the lower extremities of which are fixed to the upper extremities of the relevant arms forming the second and the third $x$, in the lower part of which a pin is provided to support the front wheels of the baby carriage.

The way in which the arms forming the first, second, third and fourth $x$ are articulated one to the other, as also the way in which the two arms for steering the baby carriage are articulated, is realized in such a way that contemporaneously with the operation of reducing the transverse volume of the structure, the upward rotation occurs of the arms carrying the pins that support the front wheels of the baby carriage, and this continues until a position alongside the steering arms of the baby carriage has been reached, with the lateral sides of the baby carriage reduced into packet form.

The first $x$ of the base of the structure reduced into packet form rotates upwards until a position is reached whereby it is alongside the rear connecting frame for the sides.

The structure becomes, in this way, very slender and limited in its overall dimensions, and thus by providing the free ends of the steering arms of the baby carriage with suitable handles, it is possible to carry it easily.

As can be seen from the foregoing description, a structure of the type in question is exceedingly complex, not at all easy to make and presents various technical/usage problems.

One technical difficulty is derived from the fact that it is not possible to have such a structure jointly with a rigid compartment or cot for the child that is really able to adequately support its occupant.

Another difficulty stems from the fact that it is not possible to leave the baby carriage immobile, when the structure is reduced in volume, without either fully resting it on the ground or propping it up against a support.

SUMMARY OF THE INVENTION

The main object of the present invention is to overcome the aforementioned difficulties and, most of all, to provide a baby carriage with a structure that can be reduced in size to allow it to be carried, in which the compartment for the child constitutes in part an integral member of the said structure, and offers characteristics that favour the body of the child being properly supported.

A further object of the present invention is to provide a baby carriage, the structure of which is particularly simple, light in weight and easy to make and assemble, as well as, furthermore, cheap to produce.

These objects and others still, which will be seen better in due course, have all been attained with the structure according to the invention which, from a general point of view, has as its essential features: a pair of flat rigid members that constitute the back of the baby carriage, these being fastened to each other by means of a hinge on one side in such a way as to allow them to adopt either a stable, roughly co-planar position or else a position in which they are side by side; a first pair of arms situated at a point corresponding to where the sides of the flat members opposite the sides hinged to one another are located, these being connected to the said flat members in a way which can allow the latter to rotate with respect to the said arms; the arms of said first pair being shaped in such a way that their lower extremities sustain the supports for the front wheels of the baby carriage and that their upper extremities, each of which provided with a handle, serve for steering or carrying the baby carriage; a second pair of arms arranged externally at the side of the arms of the first pair and articulated to them so as to provide with their upper furthermost parts, members with which to support the seat in the baby carriage, whilst their lower extremities sustain the supports for the rear wheels of the baby carriage; a third pair of arms articulated one to the other in their intermediate part, these being positioned behind the back of the baby carriage, roughly alongside the pair of flat members constituting the said back, and connected $x$ fashion to the said first and second pair of arms.

BRIEF DESCRIPTION OF THE DRAWINGS

The characteristics of the structure forming the subject of the present invention will now be made clearer from the following description of two preferred but not sole forms of embodiment, illustrated purely as unlimited examples on the accompanying drawings in which:

FIG. 1 shows the structure in question in its open condition in a perspective, almost lateral, view;

FIG. 1a shows schematically, in plan view form, the back of the baby carriage in its normal open position, as well as at an intermediate stage at the time the baby carriage is being reduced in volume;

FIG. 2 shows the same structure as illustrated in FIG. 1 but in an almost lateral perspective view after the reduction in its volume has taken place;

FIG. 3 shows the structure in the self-same state as in FIG. 2 but in a rear perspective view;

FIG. 4 shows, in a perspective view on an enlarged scale, the detail A in FIG. 1;

FIG. 5 shows, in a perspective view on an enlarged scale, the detail B in FIG. 1;

FIG. 6 shows, in an almost lateral perspective view, a second form of embodiment for the structure according to the invention, when in its open condition;

FIG. 7 shows, in an almost lateral perspective view, the same structure as in FIG. 6 but once the reduction in its volume has taken place;

FIG. 8 shows, in a perspective view on an enlarged scale, the detail A in FIG. 6;

FIG. 9 shows, in a perspective view on an enlarged scale, the detail A in FIG. 6, seen along a dimension diametrically opposed to the view in FIG. 8;

FIG. 10 shows, in a perspective view on an enlarged scale, the details A and C in FIG. 6.

DESCRIPTION OF THE PREFERRED EMBODIMENT

With reference to the above mentioned figures and, in particular, to FIGS. 1, 2 and 3, the structure that forms the subject of the present invention comprises essentially: a pair of flat members 1 and 2 fastened to each other by means of a hinge along the directrix 3 in such a way as to allow them to adopt either a stable position $P_1$ in which they are roughly co-planar or else to rotate around their hinging point until they reach a position $P_2$ in which they are side by side; on the outside of the flat members 1 and 2, situated at a point corresponding to where their sides opposite those hinged to one another are located, the two arms 4 flank the members 1 and 2 and are secured to them by means of a pair of clamps 5 which pass right round the said arms 4 and rigidly lock the members 1 and 2 in accordance with known systems.

With this type of clamping method it is possible to fix the arms 4 to the members 1 and 2, yet give the latter the possibility of rotating with respect to the said arms when the clamps 5 themselves rotate around the arms 4.

The shape of the arms 4 is such that with their lower extremities 4a, they sustain the pin that supports the front wheels 6 of the baby carriage, and that their upper extremities each form a handle 7, more about which will be said in due course.

Each arm 4 is flanked on the outside by a second arm 8 articulated at 9 to one of the said arms 4 (see FIGS. 1, 4 and 5). The arms 8 form with their upper extremities members for supporting a piece of canvas 10 which constitutes the seat in the baby carriage, and their shape is such that their lower extremities are able to carry a member 11 on which the rear wheels 12 of the baby carriage are supported (this can be best seen in FIGS. 1 and 5).

The said member 11 substantially consists of an upside down U-shaped bracket 13 placed so that it extends around the extremity of the relevant arm 8, is asymmetrically articulated at 14 thereto, and has drilled in its parallel sides a hole 15, through which passes a pin 16 on which one of the considered wheels 12 is supported. The inside of the bracket 13 in the area between the pin 16 and the arm 8 is completely filled with rubber foam or some other equivalent material, the purpose of this being to provide an elastic suspension able to oppose the free rotation of the bracket 12 around its articulation point, as well as a member for damping the stress transmitted to the structure by the wheels of the baby carriage.

At their articulation point 9, the arms 4 and 8 have their side by side surfaces slightly flattened in such a way as to create the flat walls 4b and 8b (see FIG. 4) in between which are interposed two disks 17 and 17', the purpose of this being to increase the rabbet area for the arms 4 and 8 in order to prevent, or at least to limit to a maximum, any possible convergence of the arms 8 at the time the child is seated on the canvas 10 which, as already stated, forms the seat in the baby carriage.

For this purpose, in addition to the disk 17', there is an integral plate 29 provided with two hook-on extensions 30 and 31, one opposite the other, which partially wrap round the arms 4 and 8, respectively, in the vicinity of the articulation point (see FIGS. 4 and 5) when the baby carriage is in its normal open conditon, the purpose of this also being to supply a shoulder for the said arms.

A third pair of arms 18 is shown and these are articulated to each other at 19, behind and almost up against the flat members 1 and 2, and are x fashion connected to the arms 4 and 8 (see FIGS. 1 and 3).

For the fixing of the ends of the arms 18 to the arms 4 and 8, a device given in its entirety the number 20 (clearly visible in FIG. 5) is used, and this consists of a clamp 21 fixed rigidly to the arm 4 and 8 concerned, in between the parallel sides of which is supported a cylinder 22 provided with a radial hole 23 inside which passes with a push fit a fixing member 24 that goes freely into a corresponding hole in the end of each of the arms 18.

This device makes it possible to achieve the rotation of the arms 18 both around the axis 25 and around the axis 26, which are at right angles to each other.

When the baby carriage is in its normal open condition, the flat members 1 and 2, suitably upholstered, from its back and, contemporaneously, constitute the rib members for the structure.

There is no possibility at all of the flat members 1 and 2 rotating when the child is resting up against the back of the baby carriage because of the thrust S that is applied (see FIG. 1a); indeed quite to the contrary a favourable action is produced which tends to strengthen the whole structure even more.

To reduce the volume of the structure all that has to be done is to apply a slight thrust Q on the flat members 1 and 2 where they are hinged to each other and to cause them to rotate until they are carried into a position in which they are opposite each other (see FIGS. 2 and 3).

While this operation is taking place and the transverse volume of the baby carriage is being reduced, due to the closing effect of the X formed by the arms 18, the rotation takes place of the arms 8 around the point where they are articulated to the arms 4, so that they become placed at the side of the members 1 and 2 and, contemporaneously, the rear wheels 12 of the baby carriage are moved close to the front wheels 6. In this way the maximum longitudinal dimension of the baby carriage undergoes a considerable reduction from a value $x$ (see FIG. 1) to a value $x_1$ (see FIGS. 2 and 3).

When the structure of the baby carriage is in its reduced volume condtion, the handles 7 are almost side by side and this makes it possible to easily carry the baby carriage hooked onto an arm; furthermore, when in its said reduced volume condition, the structure rests on the ground with its four wheels, which means that it is possible to release hold of it without having to lay it on the ground, rest it against a support member or hang it up.

In a second form of embodiment (see in this connection FIGS. 6, 7, 8, 9 and 10), at a point corresponding to the articulation 9 with the relevant arm 4, two flat walls 32 are provided parallel with the vertical symmetry plane of the baby carriage.

The said flat walls 32, together with the adjacent upper surface of the arm 8, are enshrouded by a hook shape extension 40a belonging to a member 40.

This hook shape extension 40a is fixed to the walls 32 of the arm 8 by two rivets 9 and 33, respectively, the former placed at a height above that of the latter constituting, furthermore, the pin for the articulation of the arms 8 and 4.

The member 40 is, furthermore, constituted by two vertical walls 40b connected by a semi-circular section 40c, the inner surface of which coincides with the opposite surface of the arm 4.

The wall 40b connecting with the hook shape extension 40a is interposed between the portions of the arms 4 and 8 situated in the proximity at a point corresponding to where the hinge pin 9 is located; in this way the rabbet area for the said arms 4 and 8 is increased close to where the hinge pin 9 articulates one to the other.

Furthermore, the hook shape extension 40a has a vertical piece 38 in which, through a rivet 39, is fixed the end of an arm rest 27 for the baby carriage. Between the arms 4 of the first pair of arms, in a position between the two opposite points 9 at which the first and second pair of arms, 4 and 8, respectively, are articulated to one another, a further pair of arms 34 is provided, one extremity of these being fastened by a hinge to a common connecting member 36, and the other, also by means of a hinge, to the arm 4 concerned of the aforementioned first pair of arms.

The connecting member 36 is substantially in the form of a "u" pointing downwards (see FIG. 10). In the two parallel walls of the said u, two rivets 35 are provided and each of these constitutes the hinge pin for one of the arms 34.

The length of the said arms 34 is such that they can go from a position M1 in which they are practically opposite each other (this occurs, see FIG. 7, when the baby carriage is in its reduced volume condition), to a position M2 (see in this connection FIG. 6) at the time the baby carriage is in its normal open condtion, and to accomplish this the axes concerned form an angle greater by 180° (viewed from the top downwards).

When changing from position M1 to position M2, the axes of the said arms 34 are never placed coaxially.

The function of the said arms 34, together with the connecting member 36, does not consist in making the structure more rigid but in creating a support for the feet of the child seated in the baby carriage.

It is obvious from the foregoing that the structure forming the subject of the present invention fully achieves the pre-set objects, since not only does the presence of the flat members 1 and 2 guarantee the spine of the child being properly supported but their incorporation in the actual structure enables it to be perfectly rigid.

Furthermore, the articulation to one another of the arms 4 and 8, and their connection to the arms 18, makes it possible to keep the structure of the baby carriage on four wheels even when it is in its reduced volume condition. Besides this, the fact that the arms 4 and 8, articulated one to the other, are not arranged on the same vertical plane makes it possible to provide the said arms with the members 27 and 28, respectively, which constitute a pair of arm rests placed bilaterally to the seat, and a pair of walls placed bilaterally to the back of the baby carriage, so as to advantageously protect the body of its occupant, without the said members representing an impediment to the reduction in volume of the structure of the baby carriage.

Other advantages are also obtained with the second form of embodiment for the structure in question: indeed the conformation of the member 40 and the fact that it is fixed to the arm 8, make it possible both to create a stop for the arms 4 and 8 and to give the structure a high degree of rigidity at the time the baby carriage is in its normal open condition.

The provision of the pair of arms 34 enables, furthermore, a support to be provided for the feet of the child seated in the baby carriage.

A further advantage of the structure in question lies in the fact that the pair of arms 34 are so sized, and that the connecting member 36 is so shaped, not to hamper the reduction in volume of the baby carriage. This relates back to the fact that when the said arms 34 go from position M1 to position M2, they never become coaxial, and thus when approaching the arms 4 of the first pair of arms at the time it is wished to reduce the volume of the baby carriage, the aforementioned arms 34 change from position M2 to position M1 without hampering, in the slightest, the reduction of the structure in question.

Obviously with the foregoing the invention is not limited purely to the forms of embodiment described and illustrated, and thus it is understood that variations of a constructional nature can be made without this in any way deviating from the protection afforded to the invention in the light of the following claims.

What is claimed is:

1. A reducible volume structure, particularly suitable for baby carriages, essential features of which are that it comprises: a pair of flat rigid members that constitute the back of the baby carriage, these being fastened to each other by means of a hinge on one adjacent side in such a way as to allow them to adopt either a stable, roughly co-planar position or else a position in which they are side by side; a first pair of arms, each arm situated at a point corresponding to where the sides of the flat members opposite the sides hinged to one another are located, these being connected to the said flat members in a way which can allow the latter to rotate with respect to the said arms; the arms of the said first pair being shaped in such a way that their lower extremities sustain the supports for the front wheels of the baby carriage and that their upper extremities, each of which provided with a handle, serve for steering or carrying the baby carriage; a second pair of arms arranged externally at the side of the arms of the first pair and articulated to them so as to provide with their upper furthermost parts, members with which to support a seat in the baby carriage, whilst their lower extremities sustain the supports for the rear wheels of the baby carriage; a third pair of arms articulated one to the other in their intermediate part, these being positioned behind the back of the baby carriage, roughly alongside the pair of flat members constituting the said back, and connected at their ends to the said first and second pair of arms.

2. A reducible volume structure, particularly suitable for baby carriages, according to claim 1, wherein the arms attached to the first and second pair have, at the point they are articulated one to the other, opposite flat areas in between which is placed at least one member with which to increase the rabbet area for the said arms; the said member being, furthermore, provided with two diametrically opposed hook-on extensions designed to partially wrap round the arms of the first and second pair in proximity of the point where they are articulated one to the other.

3. A reducible volume structure, particularly suitable for baby carriages, according to claim 1 wherein the connection of the third pair of arms to the first and second pair of arms is achieved with a device comprising a bracket fixed rigidly to one arm in the said first and second pair of arms, said bracket having a pair of parallel sides, in between the parallel sides of which is supported a cylinder provided with a radial hole designed to accept a fixing means that goes freely into a housing made in one considered extremity of an arm in the said third pair of arms to be connected to the considered arm in the said first and second pair.

4. A reducible volume structure, particularly suitable for baby carriages, according to claim 3, wherein at a point corresponding to where the arms of the first and second pair are articulated one to the other, there is a member fixed to one of the arms articulated at said point, which partially wraps round the remaining arm in proximity of the said articulation point.

5. A reducible volume structure, particularly suitable for baby carriages, according to claim 1, wherein at least the supports for the rear wheels of the baby carriage are constituted by a bracket substantially in the form of an upside down "U" placed so that it extends around the lower extremity of a relevant arm in the second pair of arms, and is asymmetrically articulated to it so as to be able to rotate in a limited fashion in both directions, the said bracket having in the extremity of its parallel sides, a pair of coaxial holes for fixing it to a pin on which one of the wheels rotates; between the said rotation pin and the extremity of the considered arm, at an intermediate position in the sides of the said bracket, an elastic member being fitted in order to oppose the free rotation of the said bracket around the point where it is articulated to the said arm.

6. A reducible volume structure, particularly suitable for baby carriages, according to claim 5, wherein at a point corresponding to where the arms of the first and second pair are articulated one to the other, there is a member fixed to one of the arms articulated at said point, which partially wraps round the remaining arm in proximity of the said articulation point.

7. A reducible volume structure, particularly suitable for baby carriages, according to claim 1 wherein at a point corresponding to where the arms of the first and second pair are articulated one to the other, there is a member fixed to one of the arms articulated at said point, which partially wraps round the remaining arm in proximity of the said articulation point.

8. A reducible volume structure, particularly suitable for baby carriages, according to claim 7, wherein the part of the said member that partially wraps round an arm in the first and second pair of arms in the proximity of the said point where one arm is articulated to the other, is substantially of U shape, and that a wall interposed between the said arms has an edge bent in the form of a hook which partially and stably enshrouds the remaining arm of the second and first pair of arms in proximity of the aforementioned articulation point.

9. A reducible volume structure, particularly suitable for baby carriages, according to claim 1, wherein in a position between the two opposite points where the first and second pair of arms are articulated one to the other and the two front wheels of the baby carriage, there is a fourth pair of arms, both of which are hinged at one end to a common connecting member, with their other extremity also hinged to a corresponding arm in the first pair of arms, the said fourth pair of arms being provided as the support for the feet of the child seated in the baby carriage.

10. A reducible volume structure, particularly suitable for baby carriages, according to claim 9, wherein the length of the arms in the said fourth pair of arms, as also the conformation of the said intermediate connecting member, are such as to form an angle between themselves coaxially when the carriage is reduced in volume.

* * * * *